(12) United States Patent
Bauer

(10) Patent No.: US 7,530,683 B2
(45) Date of Patent: May 12, 2009

(54) FIXING FLUID AND INKJET INK SETS COMPRISING SAME

(75) Inventor: Richard Douglas Bauer, Kennett Square, PA (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 407 days.

(21) Appl. No.: 11/184,938

(22) Filed: Jul. 19, 2005

(65) Prior Publication Data

US 2006/0023044 A1   Feb. 2, 2006

Related U.S. Application Data

(60) Provisional application No. 60/592,212, filed on Jul. 29, 2004.

(51) Int. Cl.
*G01D 11/00* (2006.01)

(52) U.S. Cl. .............................. 347/95; 347/100; 347/96

(58) Field of Classification Search ................. 347/100, 347/95, 96, 101; 523/160; 106/31.6, 31.27, 106/31.13
See application file for complete search history.

(56) References Cited

U.S. PATENT DOCUMENTS

| | | | |
|---|---|---|---|
| 4,336,309 A * | 6/1982 | Jackel et al. ................. | 428/447 |
| 5,085,698 A | 2/1992 | Ma et al. | |
| 5,091,468 A * | 2/1992 | Takeuchi ..................... | 524/761 |
| 5,231,131 A | 7/1993 | Chu et al. | |
| 5,693,127 A | 12/1997 | Nigam et al. | |
| 5,753,016 A | 5/1998 | Hayashi et al. | |
| 6,162,892 A | 12/2000 | Kobayashi et al. | |
| 6,180,690 B1 | 1/2001 | Spinelli | |
| 6,270,214 B1 | 8/2001 | Smith et al. | |
| 6,461,419 B1 * | 10/2002 | Wu et al. .................... | 106/31.6 |
| 6,742,869 B2 | 6/2004 | Redding et al. | |
| 6,852,156 B2 | 2/2005 | Yeh et al. | |
| 2003/0219539 A1 | 11/2003 | Nigam | |
| 2004/0104986 A1 * | 6/2004 | Nito et al. .................... | 347/96 |

FOREIGN PATENT DOCUMENTS

| | | |
|---|---|---|
| EP | 0 556 649 B1 | 8/1993 |
| JP | 63-25087 | 2/1988 |
| JP | 2002-211111 | 7/2002 |

OTHER PUBLICATIONS

Patent Abstracts of Japan, vol. 012, No. 229 (M-714) Jun. 29, 1988.
Patent Abstracts of Japan, vol. 2002, No. 11, Nov. 6, 2002.
International Search Report (PCT/US2005/026682).

* cited by examiner

*Primary Examiner*—Manish S Shah

(57) ABSTRACT

The present invention pertains to a substantially colorless, oxysilyl groups-containing fixer fluid which, when applied over or under an inkjet ink, can enhance the properties of a printed image. The invention also pertains to an ink set comprising the fixer fluid, and a printing method employing the ink set.

18 Claims, No Drawings

FIXING FLUID AND INKJET INK SETS COMPRISING SAME

CROSS-REFERENCE TO RELATED APPLICATIONS

This application claims priority under 35 U.S.C. §119 from U.S. Provisional Application Ser. No. 60/592,212 (filed Jul. 29, 2004), the disclosure of which is incorporated by reference herein for all purposes as if fully set forth.

BACKGROUND OF THE INVENTION

The present invention pertains to a fixing fluid which, when applied over or under an inkjet ink, can enhance the properties of a printed image. The invention also pertains to an ink set comprising said fixing fluid and a printing method employing the ink set.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Inkjet printers offer low cost, high quality printing and have become a popular alternative to other types of printers such as laser printers. However, inkjet printers are presently unable to match the speed of laser printers and the durability of the laser printed images. Inkjet prints with increased durability would be highly advantageous.

It is known in the inkjet art to print a fixer over and/or under a colored ink to enhance the coloristic and/or durability properties of the printed image. Typically, a fixer for dye inks is designed to increase water fastness, and a fixer for pigment inks is designed to increase chroma and/or optical density. However, fixers may also have other and/or additional beneficial effects.

Fixer fluids are generally also substantially colorless and do not perceptibly or substantially change the hue of a colored ink fixed by the fixer fluid. The fixing agents in the fixer are most commonly designed to operate by electrostatic interaction with a colorant. Thus, an ink with anionic dye or an anionic pigment dispersion is treated with a cationic fixing agent, or a cationic colorant is treated with anionic fixing agent, thereby immobilizing or "fixing" the colorant. This process is sometimes referred to in the art as "insolubilizing", "precipitating" or "crashing" the colorant. Other mechanisms of fixation are also possible such as agents that immobilize colorant by sudden and dramatic pH or viscosity change. In some cases a combination of mechanisms may be operative.

It could be advantageous for a fixer to not only operate by an electrostatic mechanism but also covalently react and thereby provide even more durability. A covalent reaction can, for example, be crosslinking.

U.S. Pat. No. 5,693,127 discloses inks with alkoxysilane polyalkyleneimine adhesion promoters.

U.S. Pat. No. 6,180,690 discloses inks with alkoxysilane binder additives.

U.S. Pat. No. 6,461,419 discloses curable inks comprising compounds with two or three reactive silyl groups.

The disclosures of all of the above-identified publications are incorporated by reference herein for all purposes as if fully set forth.

There is still a need for inks and printing methods that provide more physically durable inkjet images.

SUMMARY OF THE INVENTION

In accord with these objectives, there is provided a fixer that can operate by electrostatic and crosslinking mechanisms.

Generally, the fixer comprises a cationic fixing agent and an oxysilyl groups-containing species stably dispersed and/or dissolved in a liquid vehicle.

In a preferred embodiment the fixer comprises a cationic oxysilyl groups-containing species stably dispersed and/or dissolved in the liquid vehicle.

By "oxysilyl groups-containing species" is meant a molecule (monomeric, oligomeric or polymeric) containing one or more reactive hydroxysilyl, alkoxysilyl, aryloxysilyl and/or acyloxysilyl moieties ("oxysilyl groups") selected from the group consisting of formulas (IA) and (IB):

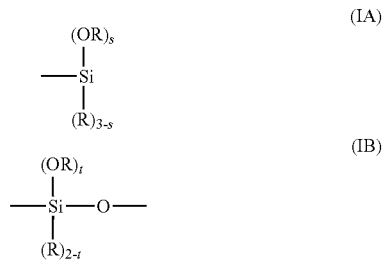

wherein
each R is individually a hydrogen, an alkyl group, an aryl group or an acyl group, and preferably an alkyl group;
s is 1, 2 or 3; and
t is 1 or 2, provided that if s or t is 1, then the molecule contains at least two such moieties (which may be the same or different).

The alkyl groups preferably have from 1 to 30 carbon atoms, more preferably from 1 to 12 carbon atoms and still more preferably from 1 to 4 carbon atoms. Alkyl also includes cycloalkyl, but is preferably acyclic. The aryl groups preferably have from 6 to 30 carbon atoms. The organic (non-carbonyl) portion of the acyl group is preferably an alkyl or an aryl group as just defined. Especially preferred is methyl.

As indicated above, the oxysilyl groups-containing species contains at least two reactive functionalities that can individually be on different silicon atoms in the molecule (requiring at least two groups of the formula (IA) and/or (IB) (e.g., hydroxy and/or alkoxy terminated polydimethylsiloxanes), and/or they can be on the same silicon atom (requiring at least one group of the formula (IA) and/or (IB)).

Oxysilyl groups are reactive with a variety of functional moieties, for example, active hydrogen-containing moieties such as hydroxyl groups. Oxysilyl groups will also self-crosslink—upon condensation and elimination of water between these species in a printed layer, a silicon-oxygen covalent network providing durability is established. The oxysilyl groups can also react with, for example, hydroxyl groups on a substrate (such as paper or a textile), increasing ink adhesion.

The fixer fluid in any of these embodiments contains substantially no colorant and is substantially colorless. The fixer vehicle can be aqueous or non-aqueous.

The invention further pertains to an inkjet ink set comprising the above fixer fluid and one or more colored inks. In a preferred embodiment, the inkjet ink set comprises a at least three (such as CMY), and more preferably four (such as CMYK), differently colored inkjet inks comprising, individually, a colorant stably dispersed or dissolved in a vehicle. The vehicle is preferably an aqueous vehicle.

The invention further pertains to an inkjet printer equipped with an inkjet ink set as set forth above and as described in further detail below.

The present invention also relates to a method for ink jet printing onto a substrate, comprising the steps of:

(a) providing an ink jet printer that is responsive to digital data signals;

(b) loading the printer with a substrate to be printed;

(c) loading the printer with an inkjet ink set as set forth above and as described in further detail below; and (d) printing onto the substrate using the inkjet ink set in response to the digital data signals.

Finally, the present invention relates to an article printed with the above-mentioned ink set, using the above-mentioned printer, and/or using the above-mentioned printing method.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Fixer

The fixer (or "fixing") fluid of the present invention comprises a vehicle, a cationic fixing agent and an oxysilyl groups-containing species. As described in further detail below, the cationic fixing agent and oxysilyl groups-containing species may be separate entities, and/or may be a single entity possessing both functions (the cationic oxysilyl groups-containing species).

The fixer contains substantially no colorant and is substantially colorless, but can contain other inkjet formulation ingredients as are well known in the art.

Cationic fixing agents (as a separate component) include, for example, a multivalent metal cation and a cationic polymer.

The cationic polymer can be a soluble polymer, a cationic hydrosol or dispersed polymer, or an emulsion polymer dispersed in the liquid vehicle. Examples of preferred water-soluble cationic polymers are protonated forms of polyamines including polyethyleneimine, polyvinylpyridine, polyvinylamine, polyallylamine and combinations thereof. In a preferred embodiment, the cationic polymer is selected from the group consisting of polyethyleneimines, water-soluble cationic dendrimers, water-dispersed alkoxylated forms of polyethylenimines, water-soluble dispersed alkoxylated forms of cationic dendrimers, and polydiallyldimethyl ammonium chlorides. In a particularly preferred embodiment, the soluble cationic polymer is a polyethyleneimine.

The preferred molecular weight, Mn, of soluble polymer fixing agents is between about 1,000 and 10,000 g/mol.

The cationic polymer may also be a copolymer of different cationic monomers, or a copolymer of cationic and nonionic monomers. The copolymer can be random or structured—linear, grafted (comb) or branched.

Examples of polymerizable monomers that can be incorporated into soluble homopolymers or copolymers include acrylic esters having tertiary amines such as N,N-dimethylaminoethyl methacrylate, N,N-dimethylaminoethyl acrylate, N,N-dimethylaminopropyl methacrylate, N,N-dimethylaminopropyl acrylate; acrylamides having tertiary amines such as N,N-dimethylaminopropyl acrylamide, N,N-dimethylaminoethyl acrylamide, N, N-dimethylaminopropyl methacrylamide, N, N-dimethylaminoethyl methacrylamide, and the like.

Cationic emulsion or dispersed polymers may be employed as a fixing agent. These can be made from polymerizable monomers such as mentioned in the preceding paragraph.

Multivalent metal cations may be employed as a fixing agent. "Multivalent" indicates an oxidation state of two or more and, for an element "Z", are typically described as $Z^{2+}$, $Z^{3+}$, $Z^{4+}$ and so forth. For brevity, multivalent cations may be referred to herein as "$Z^x$". The multivalent cations are preferably soluble in the aqueous ink vehicle and preferably exist in a substantially ionized state. The multivalent cations should be in a form where they are free and available to interact with colorant being fixed.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. Preferred are those of the elements Ca, Mg, Zn, Cu and Al. The effective amounts needed in a particular situation can vary, and some adjustment will generally be necessary.

Other examples of cationic substances which may be useful as fixing agents include primary, secondary or tertiary amine salt compounds, such as hydrochloride or acetate of lauryl amine or stearyl amine; a phosphonium salt; a sulfonium salt; an ammonium salt, such as quaternary ammonium salts like lauryltrimethylammonium chloride or benzyltributylammonium chloride; a pyridium salt compound such as cetylpyridinium chloride or cetylpyridinium bromide; and an arsonium salt. The ammonium, phosphonium and arsonium salts may be mono-, di-, tri or tetra-substituted, or mixtures thereof.

A cationic surfactant may be used as a fixing agent including, for example, quaternized ammonium or pyridinium surfactants, such as dodecyltrimethylammonium chloride, cetyltrimethylammonium bromide, cetyltrimethylpyridinium chloride and others.

Amphoteric surfactants that, within a certain pH range, are cationic may also be used. In this case the pH of the liquid composition must be adjusted below the isoelectric point of the surfactant. Examples of zwitterionic surfactants that are useful in the practice of the invention include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin.

As indicated above, oxysilyl groups-containing species are molecules (monomeric, oligomeric or polymeric) with two or more reactive hydroxysilyl, alkoxysilyl, aryloxysilyl and/or acyloxysilyl moieties per molecule. Preferred reactive oxysilyl groups comprise a silicon atom substituted with at least one hydroxyl, alkoxy, aryloxy and/or acyloxy group. Depending on the embodiment, the silicon atom can be substituted with one, two or three such groups.

Oxysilyl groups-containing species useful in this invention can incorporate a wide variety of backbones to support the oxysilyl groups. Examples of two kinds of general classes of such species are represented by Formulas (IV) and (V):

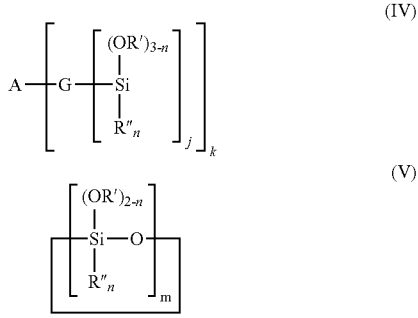

$$A \left[ G \left[ \begin{array}{c} (OR')_{3-n} \\ | \\ Si \\ | \\ R''_n \end{array} \right]_j \right]_k \quad (IV)$$

$$\left[ \begin{array}{c} (OR')_{2-n} \\ | \\ Si - O \\ | \\ R''_n \end{array} \right]_m \quad (V)$$

wherein:

A is a k-valent group which may be selected from, for example, a chemical bond (i.e., no atoms); —OR"; alkyl groups (preferably having 1 to 30 carbon atoms, and more preferably 12 to 20 carbon atoms); cycloalkyl groups (preferably having 3 to 30 carbon, and more preferably 6 to 10 carbon atoms), aryl groups (preferably having 6 to 30 carbon atoms); a chalcogen (group VIb elements) such as oxygen and sulfur; and polymeric radicals which may be of linear, branched, block or graft construction;

each G independently represents an optional multivalent group having a valence of at least 2;

each R' independently represents hydrogen, an alkyl group (preferably having 1 to 30, carbon atoms, and more preferably 1 to 4 carbon atoms), a cycloalkyl group (preferably having 3 to 30 carbon atoms, and more preferably 6 to 10 carbon atoms), an aryl group (preferably having 6 to 30 carbon atoms), an alkanoyl group (preferably having 2 to 30, more preferably 2 to 4 carbon atoms), or an aroyl group (preferably having from 7 to about 30 carbon atoms);

each R" independently represents hydrogen, an alkyl group (preferably having 1 to 30, more preferably 1 to 10 carbon atoms), a cycloalkyl group (preferably having 3 to 30 carbon atoms, and more preferably 6 to 10 carbon atoms), an aryl group (preferably having 6 to 30 carbon atoms), an alkanoyl group (preferably having 2 to 30 carbon atoms, and more preferably 2 to 10 carbon atoms), or an aroyl group (preferably having from 7 to 30 carbon atoms);

each n is either 0, 1, or 2 with the proviso that compounds of either Formula (I) or Formula (II) above have at least two reactive oxysilyl groups;

each j independently represents 0 or an integer greater than or equal to 1;

k represents an integer greater than or equal to 1; and m represents an integer greater than or equal to 3.

Non-limiting examples of suitable polymeric groups for A include polysiloxanes, polyacrylates, polyamides, polyolefins, polyethers, polyesters, polyurethanes, polyureas, and polyphosphazenes, as well as derivatives and combinations thereof. The polymeric groups may be hydroxyl (to form a silanol), alkoxy, aryloxy and/or acyloxy terminated, or may have pendent silanol, alkoxysilyl, aryloxysilyl and/or acyloxysilyl groups. Preferred groups for radical A include silanoland/or alkoxy-terminated polysiloxanes, polyacrylates, polyolefins and polyethers.

Non-limiting examples of G include —Si(OR')$_x$— wherein x=0-2; hydrocarbon diyls and oxydiyls, particularly alkanediyls and oxydiyls such as methylidene, ethylidene, 1,3-propanediyl, 1,5-pentanediyl, 2-oxo-propanediyl and phenylene (an arenediyl); chalcogens such as oxygen and sulfur; and hydrocarbon triyls such as, for example, pentaerythritoltriyl.

Nonlimiting examples of difunctional silyl groups-containing species of the formulas (IV) and (V) include hydroxy and/or alkoxy terminated polydimethylsiloxanes having a molecular weight (Mn) of 400 to 150000; hydroxy and/or alkoxy terminated diphenylsiloxane-dimethylsiloxane copolymers; hydroxy and/or alkoxy terminated polydiphenylsiloxanes; hydroxysilyl and/or alkoxysilyl terminated polytrifluoropropylmethyl siloxanes, polyesters, polyurethanes and polyacrylates; dialkyl- and substituted dialkyldialkoxysilanes, such as diethyldiethoxysilane, dimethyldimethoxysilane, diethyldiethoxysilane, diisobutyldimethoxysilane, dimethyldiethoxysilane, diisopropyldimethoxysilane, bis(3-cyanopropyl)dimethoxysilane, chloromethylmethyldiethoxysilane, (3-chloropropyl)methyldimethoxysilane, (3-cyanopropyl)methyldimethoxysilane, cyclohexylethyldimethoxysilane, dodecylmethyldiethoxysilane, isobutylmethyldimethoxysilane, 3-mercaptopropylmethyidimethoxysilane; mercaptomethylmethyldiethsysilane, methacryloxypropylmethyldiethoxysilane, methacryloxypropylmethyldimethoxysilane, methyldiethoxysilane, methyidimethoxysilane, n-octadecylmethyldiethoxysilane; n-octylmethyidiethoxysilane and dicyclopentyldimethoxysilane; aryl and diaryl substituted alkoxysilanes, such as diphenyldimethoxysilane, phenyldiethoxysilane, phenylmethyldiethoxysilane and phenylmethyldimethoxysilane; hydroxysilyl and alkoxysilyl substituted arenes, such as 1,4-bis(hydroxydimethylsilyl)benzene and 1,3-bis(methoxydimethylsilyl)benzene; trialkylsilyl substituted alkoxysilanes, such as bis(trimethylsilylmethyl)dimethoxysilane and trimethylsilylmethyld imethoxysilane; cyclic alkoxysilanes, such as 1,1-diethoxy-1-silacyclopent-3-ene; acyloxy substituted silanes, such as dimethyidiacetoxysilane, vinylmethyldiacetoxysilane and diethylbenzoyloxyacetoxysilane; geminal silanediols, such as diphenylsilanediol and dicyclohexylsilanediol; alkyl and/or aryl substituted cyclic siloxanes, such as 3-(3,3,3-trifluoropropyl) heptamethyltrisiloxane, hexamethyltrisiloxane and octamethyltetrasiloxane; alkenyl substituted alkoxysilanes, such as vinylethyldiethoxysilane, vinylmethyldimethoxysilane and vinylphenyldiethoxysilane.

Nonlimiting examples of trifunctional silyl groups-containing species of the formulas (IV) and (V) include, for example, isobutyltrimethoxysilane, methytriethoxysilane, methytrimethoxysilane, octyltriethoxysilane, propyltrimethoxysilane, phenyltrimethoxysilane, mercaptopropyltrimethoxysilane, glycidyloxypropyltrimethoxysilane, methacryloxypropyltrimethoxysilane, vinyltriethoxysilane and vinyltrimethoxysilane.

Nonlimiting examples of tetrafunctional silyl groups-containing species of the formulas (IV) and (V) include, for example, tetramethoxysilane; tetraethoxysilane; 1,3-dimethyltetramethoxydisiloxane; 1,3-di-n-octyltetramethoxydisiloxane; 1,3-divinyltetraethoxydisiloxane; 1,1,3,3-tetraethoxy-1,3-dimethyldisiloxane; tetrakis(butoxyethoxyethoxy)silane; tetrakis(ethoxyethoxy)silane; tetrakis(trimethylsiloxy)silane; tetrakis(2-ethylhexoxy)silane; tetrakis(2-methacryloxyethoxysilane); tetrakis(methoxyethoxyethoxy)silane; tetrakis(methoxyethoxy)silane; tetrakis(methoxypropoxy)silane; and tetra-n-propoxysilane.

Nonlimiting examples of higher functional silyl groups-containing species of the formulas (IV) and (V) include, for example, bis(3-(methyidimethoxysilyl)propyl)polypropylene oxide; bis(triethoxysilyl) ethane; bis(triethoxysilyl)ethylene; bis(triethoxysilyl)methane; 1,9-bis(triethoxysilyl) nonane; bis(triethoxysilyl)-1,7-octadiene; bis(triethoxysilyl) octane; bis(3-(triethoxysilyl)propyl)-tetrasulfide; bis(3-(triethoxysilyl)propyl)urea; bis(trimethoxysilyl)ethane; 1,4-bis(trimethoxysilylethyl)benzene; bis(trimethoxysilyl) hexane; bis(trimethylsiloxy)cyclobutene; di-t-butoxydiacetoxysilane; hexamethoxydisilane; hexaethoxydisilane; tetraacetoxysilane; tetraallyloxysilane;

tetra-n-butoxysilane; 1-(triethoxysilyl)-2-(diethoxymethylsilyl)ethane; and functional polymers such as poly(diethoxysiloxane).

These and other examples and details of oxysilyl groups-containing species of the formulas (IV) and (V) (useful in this invention) are described, for example, in U.S. Pat. No. 6,461,419, the disclosure of which is incorporated by reference herein for all purposes as if fully set forth.

In a preferred embodiment, the cationic fixing agent and oxysilyl group-containing species are both in the same molecule—in other words an oxysilyl group-containing species that also contains a cationic moiety that acts as fixing agent. Such species are hereafter referred to as "cationic oxysilyl groups-containing species".

A cationic oxysilyl groups-containing species is a molecule (monomeric, oligomeric or polymeric) containing at least one, preferably at least two (or more), covalently bonded cationic moieties, at least one, preferably at least two (or more), covalently bonded oxysilyl moieties; and at least two reactive hydroxysilyl, alkoxysilyl, aryloxysilyl and/or acyloxysilyl moieties.

The cationic moiety is preferably a cationic (protonated or quarternized) nitrogen.

One example of a cationic oxysilyl groups-containing species is an oligomer or polymer containing segments a and b as illustrated in Formula (VI):

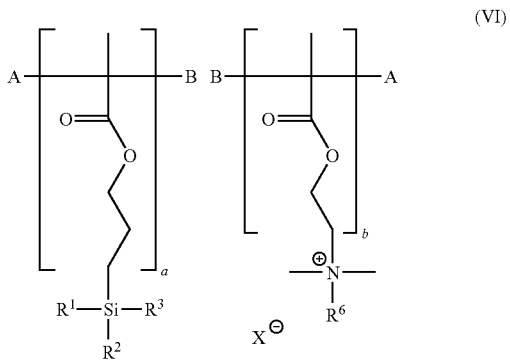

(VI)

wherein:
a and b are individually integers greater than or equal to 1;
each A is individually a link to another segment of the oligomer/polymer or a chain-terminating group;
each B is individually a link to another segment of the oligomer/polymer;
each $R^1$, $R^2$, and $R^3$ is independently a hydroxy, alkoxy, aryloxy, acyloxy or alkyl group, wherein at least one is (and preferably two are) a hydroxy, alkoxy, aryloxy and/or acyloxy group, and wherein if a=1 then at least two of $R^1$, $R^2$ and $R^3$ are independently a hydroxy, alkoxy, aryloxy and/or acyloxy group;
each $R^6$ is individually alkyl, aryl or hydrogen;
each $X^-$ is individually a counter anion, such as a halide, sulfate, nitrate or sulfonate.

An example of a polymer depicted by formula (VI) is an acrylic copolymer derived from dimethylaminoethyl(meth)acrylate (b units) and trialkoxysilylpropyl(meth)acrylate (a units), prepared by radical or group transfer polymerization, wherein the dimethylamino group in the b unit has been partially or fully protonated and/or alkylated to create a positive charge on the nitrogen. Preferably the polymer contains at least two of the protonated and/or alkylated nitrogens per molecule (at least two b units).

A similar polymer or copolymer can be prepared, as shown in Formula (VII), containing dimethylaminoethyl(meth) acrylate which is then alkylated with 3-chloropropyltrialkoxysilane or 3-glycidoxypropyltrialkoxysilane. This polymer would already contain positive charges as many of the nitrogens are alkylated. The unreacted nitrogen atoms could, if desired, be protonated with an acid and/or further alkylated with methyl chloride, benzyl choride, dimethyl sulfate, or some other typical alkylating agent.

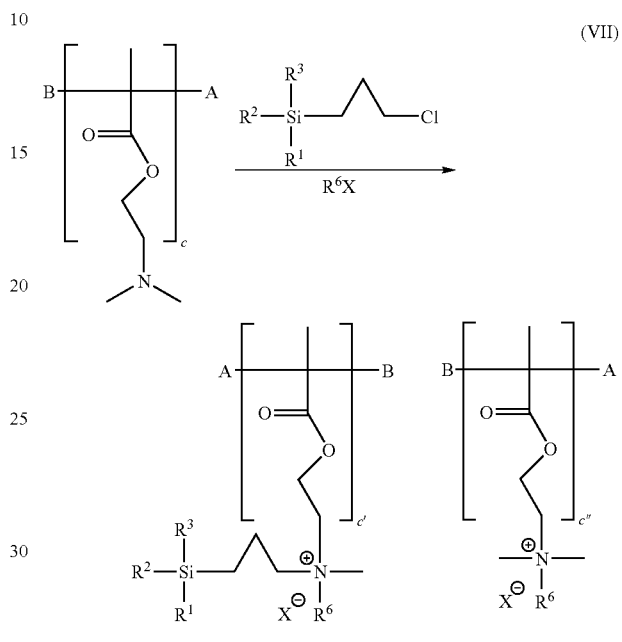

(VII)

wherein:
c is an integer greater than or equal to 2;
c' and c" are individually integers greater than or equal to 1; and
each of A, B, $R^1$, $R^2$, $R^3$, $R^6$ and $X^-$ is individually defined as set forth above for formula (VI).

A similar polymer can be prepared, as shown in Formula (VIII), by making a copolymer containing isocyanatoethyl (meth)acrylate units (d) and dimethylaminoethyl(meth)acrylate units (e), and reacting it with 3-aminopropyltrialkoxysilane, followed by either alkylation or protonation or some combination of alkylation and protonation.

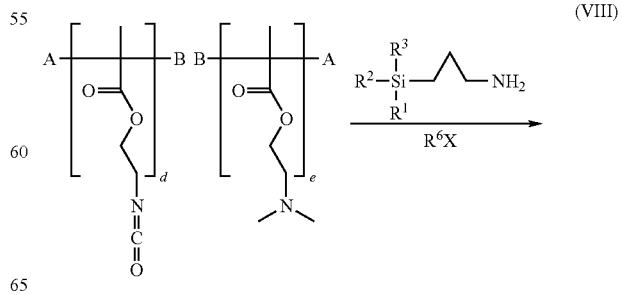

(VIII)

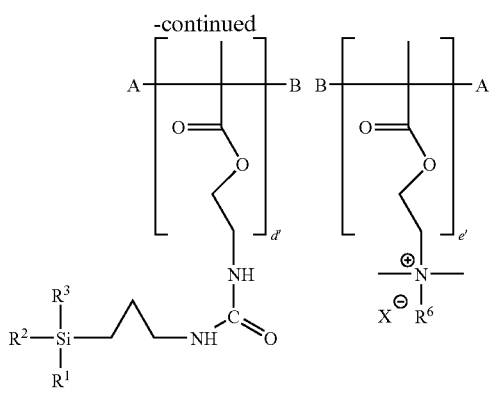

wherein:

d, e, d' and e' are individually integers greater than or equal to 1; and each of A, B, $R^1$, $R^2$, $R^3$, $R^6$ and $X^-$ is individually defined as set forth above for formula (VI).

In the polymers described above a number of factors can be varied in order to optimize performance in terms of providing printed durability, enhanced printed optical density, ink stability, ink cure, and minimizing corrosion of the printing apparatus. These factors include: molecular weight, molecular structure, (e.g., linear, branched, or star polymer), glass transition temperature, and counter ions associated with the cationic charges. Also, the nature and number of "oxy" groups on the silicon can control the rate of hydrolysis and stability in solution. Positive charge density can be controlled by pH and/or degree of quaternization. The physical state may be a latex or dispersion.

Other primary, secondary, or tertiary amine containing molecules could also be used in this invention. Examples include oligomers and polymers containing allyl amine, aminoethyl (meth)acrylate, diallylamine, propylenimine and ethylenimine. Alkylation of these amine containing materials with 3-chloropropyltrialkoxysilane or 3-glycidoxypropyltrialkoxysilane to incorporate the desired amount of siloxane functionality, followed by protonation and/or alkylation if necessary, would lead to the desired materials.

Thus according to the present invention simple molecules containing alkylamine groups, such as derived from ethylenimine and a reactive oxysilyl group-containing compound, would be included in this invention, as illustrated in Formula (IX).

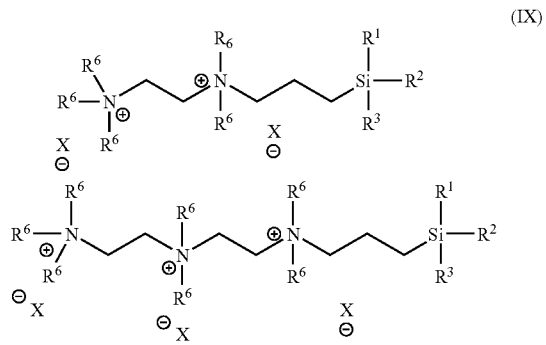

wherein each of $R^1$, $R^2$, $R^3$, $R^6$ and $X^-$ is individually defined as set forth above for formula (VI), provided that at least two of $R^1$, $R^2$ and $R^3$ are independently a hydroxy, alkoxy, aryloxy and/or acyloxy group.

The amine groups can be alkylated, protonated, or some combination of both.

Higher molecular weight oligomers and polymer analogs of these simple molecules, containing units such as depicted by the following Formula (X), are also suitable:

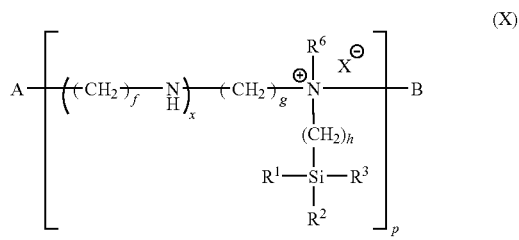

wherein each of A, B, $R^1$, $R^2$, $R^3$, $R^6$ and $X^-$ is individually defined as set forth above for formula (VI);

f is from 1 to 8;

g is from 1 to 8;

h is from 1 to 6;

p is 1 or more; and x is 1 to 50.

The amine groups in formula (X) can be alkylated, protonated, or some combination of both. Preferably at least one of $R^1$, R 2 and $R^3$ is a $C_1$-$C_6$ alkoxy group, and any of $R^1$, $R^2$ and $R^3$ that are not alkoxy groups are $C_1$-$C_6$ alkyl groups.

A preferred material of the formula (X) is N-(3-(trimethoxysilyl)propyl)polyethylenimine hydrochloride available as a 50% solution in 2-propanol from Aldrich Chemical. This polymer is 60% polyethylenimine with an Mn of 1200. In Formula (X), x=6, p=4, a=2, b=2 and c=3. There is on average one Si for every seven nitrogen atoms, an Si functionality of 4, i.e., 4 Si atoms per molecule and a molecular weight (Mn) of 2000. The nitrogen carrying the Si group also has a chlorine counter ion. The preparation of such a material by alkylating polyethylenimine with 3-chloropropyltrimethoxysilane is described in U.S. Pat. No. 6,162,892 (the disclosure of which is incorporated by reference herein for all purposes as if fully set forth).

Propyleneimine dendrimers can provide a pathway to highly branched reactive cationic oxysilyl groups-containing fixers. These molecules and oligomers are made by Dendridic NanoTechnologies (Mt. Pleasant, Mich., USA) and are available in several molecular weights, each representing an increase in the number of surface amines available for reaction. The surface amines can be alkylated with 3-chloropropyltrialkoxysilane, and then protonated or further alkylated with an alkyl halide to provide the optimal ratios of reactive oxysilyl functionality, positive charge density, and pH in solution. An example of a simple branched structure is shown in Formula (XI).

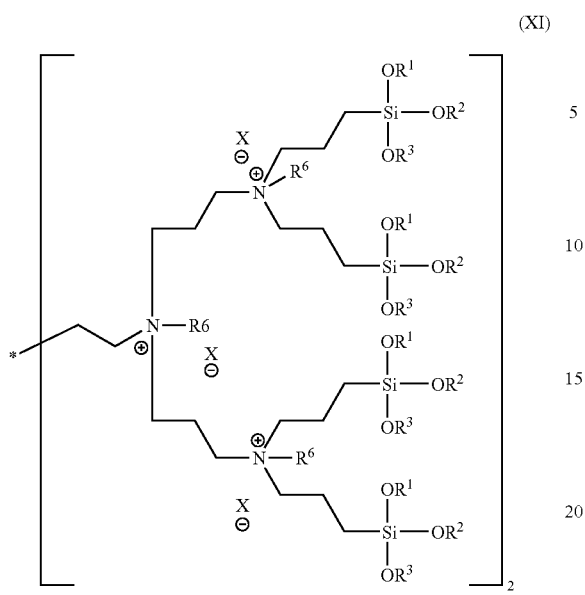

(XI)

wherein each of $R^1$, $R^2$, $R^3$, $R^6$ and $X^-$ is individually defined as set forth above for formula (VI).

Highly branched molecules, oligomers or polymers like that illustrated offer the possibility of high charged and reactive functionality with a minimum of viscosity build in the ink.

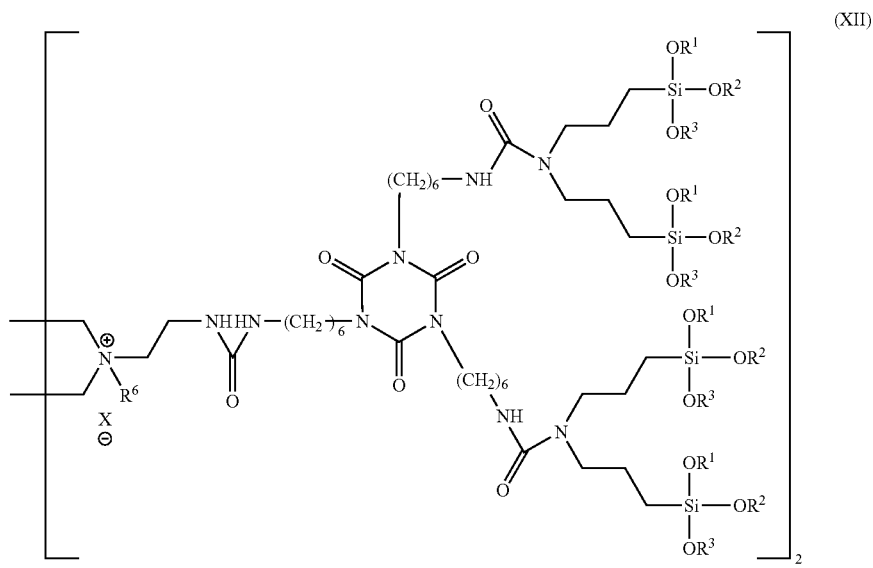

(XII)

Yet another approach to reactive cationic oxysilyl functional molecules is through polyurethane chemistry. As a descriptive example, one can link hexamethylene diisocyanate trimer with the appropriate multifunctional amines, and cap off the remaining isocyanates with aminopropyltrialkoxysilane. If additional oxysilyl functionality is needed in the molecule, it can be provided by reacting tertiary amine centers in the molecule with 3-chloropropyltrialkoxysilane. Again, if needed, the molecule can be further alkylated or protonated to provide the optimal ratios of oxysilyl functionality, positive charge density, and pH in solution. And example molecule is illustrated in Formula (XII).

wherein each of $R^1$, $R^2$, $R^3$, $R^6$ and $X^-$ is individually defined as set forth above for formula (VI).

Polycarbodiimides provide yet another starting material to reactive cationic oxysilyl functional molecules. Carbodilite® V05 (Nisshinbo Industries) is a polycarbodiimide end capped with isocyanate groups. These isocyanates can be reacted with aminopropyltrialkoxysilane and/or bis(3-(alkoxysilyl)propyl)amine to link the oxysilyl functionality to the oligomer end with urea groups. The carbodiimide groups can further be reacted with dimethylaminoglycine. The amino groups can further be alkylated or protonated to provide the optimal ratios of oxysilyl functionality, positive charge density, and pH in solution. An example molecule is illustrated in Formula (XIII):

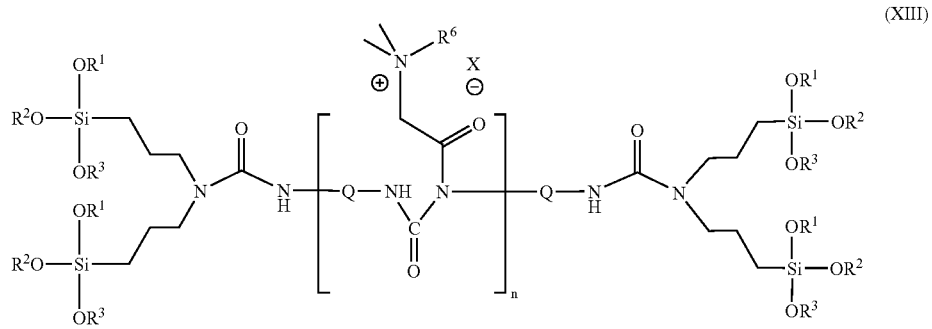

(XIII)

wherein
each of $R^1$, $R^2$, $R^3$, $R^6$ and $X^-$ is individually defined as set forth above for formula (VI);
each Q is individually a linking group, such as an alkylene group; and
n is an integer of one or greater.

Although not limited, concentrations of oxysilyl groups-containing species in the fixer can be in the range of about 0.5 to 25% by weight of the total weight of fixer.

Vehicle

The vehicle for the fixer fluid and inks of the ink set (discussed further below) can be aqueous or non-aqueous.

By "aqueous vehicle" it is meant water or a mixture of water and at least one water-miscible organic solvent (co-solvent). Selection of a suitable mixture depends on requirements of the specific application, such as desired surface tension and viscosity, the selected fixer, drying time of the fixer fluid, and the type of substrate onto which an aqueous fixer fluid will be printed. If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynol® series from Air Products), ethoxylated primary (e.g. Neodol series from Shell) and secondary (e.g. Tergitol series from Union Carbide) alcohols, sulfosuccinates (e.g. Aerosol® series from Cytec), organosilicones (e.g. Silwet® series from Witco) and fluoro surfactants (e.g. Zonyl®) series from DuPont). The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of monodi- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Colored Inks

Colored inks comprise at least colorant and vehicle. The colorants can be soluble (dye) or dispersed (pigment) in the ink vehicle. In some cases, dyes can be encapsulated in a polymer matrix and dispersed like a pigment. Colored inks can also contain other ingredients as are well known in the art.

Anionic colorant refers to a colorant yielding, in aqueous medium, colored anions (soluble dye) or colored particles with anionic surface charge. Conversely, cationic colorant refers to a colorant yielding, in aqueous medium, colored cations (soluble dye) or colored particles with cationic surface charge. Particle surface charge can be imparted, for example, by an adsorbed polymer with anionic or cationic moieties, or by chemical modification of the particle surface with anionic or cationic moieties.

Conventional dyes are useful in this invention, and such dyes are generally well known to those of ordinary skill in the art. Typically anionic dyes contain carboxylic or sulfonic acid groups as the ionic moiety.

The types of anionic dyes most useful in this invention are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23. The black colorant may also be dye as, for example, the black dye disclosed in U.S. Pat. No. 5,753,016 (the disclosure of which is incorporated by reference herein for all purposes as if fully set forth).

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. The black pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

The anionic colored ink can also contain a species with oxysilyl functionality capable of covalently bonding with the oxysilyl functionality in fixer species. An example of such an ink, where the oxysilyl species is a binder additive, is described in U.S. Pat. No. 6,180,690 (the disclosure of which is incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Useful pigments include (cyan) Pigment Blue 15:3 and 15:4; (magenta) Pigment Red 122; (yellow) Pigment Yellow 128, Pigment Yellow 95, Pigment Yellow 155 and Pigment Yellow 74; and (black) carbon black.

Other Ingredients

Other ingredients may be formulated into the fixer fluid and inkjet ink, to the extent that such other ingredients do not interfere with the stability and jetability of the fluid/ink, which may be readily determined by routine experimentation. Such other ingredients are in a general sense well known in the art.

For example, polymer additives may be added. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'', N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Fluid/Ink Properties

Drop velocity, separation length of the droplets, drop size and stream stability are greatly affected by the surface tension and the viscosity of the fluid/ink. The fixer fluids and ink jet inks used in this invention should typically have a surface tension in the range of about 20 dyne/cm to about 70 dyne/cm at 25° C. Viscosity can be as high as 30 cP at 25° C., but is typically somewhat lower, more typically in the range of about 1 to about 20 cps. The fluid/ink has physical properties that are adjusted to the ejecting conditions and printhead design. The fluid/inks should have excellent storage stability for long periods so as not clog to a significant extent in an ink jet apparatus. The various components should be stable in solution/dispersion, that is, one or more of the components does not readily form a precipitate under normal conditions of storage or use. Further, the fluid/ink should not corrode parts of the ink jet printing device it comes in contact with, and it should be essentially odorless and non-toxic. The fluid/inks are particularly suited for drop on demand inkjet printheads, especially thermal and piezo printheads.

Proportions of Ingredients

The components described herein can be combined in various proportions and combinations to make a fluid/ink with the desired properties, as generally described above, and as otherwise generally recognized by those of ordinary skill in the art. Some experimentation may be necessary to optimize fluid/inks for a particular end use, but such optimization is generally within the ordinary skill in the art.

For example, the amount of vehicle in a fluid/ink is typically in the range of about 70% to about 99.8%, and preferably about 80% to about 99.8%, by weight based on total weight of the fluid/ink.

The fixing agent(s) typically will be present at levels of at least about 0.5% up to about 25%, and more typically in the range of about 1% to about 20%, by weight based on the total weight of fixer fluid.

In a colored ink, colorant will generally be present in amounts up to about 12%, and more typically in the range of about 0.1 to about 9%, by weight based on the total weight of the colored ink.

Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the fluid/ink. Surfactants, when added, are generally in the range of about 0.2 to about 3% by weight based on the total weight of the fluid/ink. Polymers other than cellulose esters can be added as needed, but will generally be less than about 15% by weight based on the total weight of the fluid/ink.

Ink Sets

The ink sets in accordance with the present invention preferably comprise a fixer fluid and at least three differently colored inks (such as CMY), and preferably at least four differently colored inks (such as CMYK), wherein the colored inks of the ink set are preferably aqueous inks, and may contain dyes, pigments or combinations thereof as the colorant. The ink set may further comprise one or more "gamut-expanding" inks, including different colored inks such as an orange ink, a green ink, a red ink and/or a blue ink, and combinations of full strength and light strengths inks such as light cyan and light magenta.

A non-aqueous fixer vehicle can be advantageous when used with aqueous colored inks as the water load on the media is reduced.

Methods of Printing

The inks and ink sets of the present invention can be utilized by printing with any inkjet printer. A colorless ink, when utilized, can be applied over the colored ink(s) as an overcoat to improve properties of the printed image, such as durability.

It is preferred that the fixer fluid be applied over dye-based inks (overprinted), and under pigment-based inks (underprinted).

Substrates

Substrates suitable for use in the present invention can be any useful substrate known to those of ordinary skill in the relevant art. For example, the substrate can be plain paper such as common electrophotographic copier paper. The substrate can also be specialty media such as microporous papers, polymer coated papers and hybids of the two. The substrate can be a non-woven textile such as spun bonded polyolefin (e.g. Tyvek®, DuPont Co.). The substrate can also be a natural and/or synthetic woven textile such as silk, cotton, nylon and polyester.

EXAMPLES

This invention now will be further illustrated, but not limited, by the following examples. Water was deionized prior to use. BYK® 348 is a surfactant from Byk Chemie.

Dispersion 1

This dispersion was Cab-O-Jet® 300 used as received from the vendor, Cabot Corporation (aqueous dispersion with 15.5% self-dispersed carbon black pigment that has been surface-modified with grafted carboxylate groups).

Acrylic Latex

This latex was prepared in the same manner as the "Dispersed Binder" described in the examples of U.S. Pat. No. 6,742,869 (the disclosure of which is incorporated by reference herein for all purposes as if fully set forth) and contained 36.1% polymer solids in aqueous dispersion.

Oxysilyl Groups-Containing Precursor Polymer (to COGCS 1 and 2)

This shows the preparation of an oxysilyl groups-containing polymer, 3-(trimethoxy)silylpropyl methacrylate-co-benzyl methacrylate-co-dimethylaminoethyl methacrylate (10/10/5).

A 3-liter flask was equipped with a mechanical stirrer, thermometer, $N_2$ inlet, drying tube outlet and addition funnels. Tetrahydrofuran (THF, 914 g) and mesitylene (5.0 g) were charged to the flask. Tetrabutyl ammonium m-chlorobenzoate (catalyst, 0.8 ml of a 1.0 M solution in acetonitrile) was then added. 1-methoxy-trimethylsiloxy propene (initiator, 26.0 g (0.15 M)) was injected. Feed I (tetrabutyl ammonium m-chlorobenzoate, 0.8 ml of a 1.0 M solution in acetonitrile) was started and added over 150 minutes. Feed II was composed of 3-(trimethoxy)silylpropyl methacrylate (Aldrich, 371.0 g (1.50 M)), benzyl methacrylate (265.5 g (1.50 M)) and dimethylaminoethyl methacrylate (117.7 g (0.75 M)). Feed II was started at 0. 0 minutes and added over 30 minutes. Fifty minutes after Feed I was completed, 160.7 g of dry methanol was added to the above solution and distillation begun. During the first stage of distillation, 138.4 g of material was removed from the flask. An addition 200.0 g of dry methanol was added, and the distillation continued until another 156.0 g of solvent was removed. A total of 338.4 g of solvent was removed. This made a 3-(trimethoxy)silylpropyl methacrylate/BZMA/DMAEMA 10/10/5 (50/35/15 weight %) polymer at 62.65 wt % solids with an Mn=5,000.

COGCS 1

To 500 grams of the above siloxane precursor polymer was added 35.4 grams of benzyl chloride. The solution after heating to reflux for 4 hours and holding over night, yielded a solution of quaternized polymer with an amine number of 5.7 at 66.6% solids in methanol.

COGCS 2

This species refers to the protonated form (phosphate salt) of the oxysilyl groups-containing precursor formed by acidification of the polymer solution with phosphoric acid. Protonation was accomplished in situ in the ink formulation by dissolving the precursor in the vehicle along with the acid.

Cationic Siloxane 3

This polymer was N-(3-(trimethoxysilyl)propyl)polyethylenimine hydrochloride, as a 50 wt % solution in 2-propanol, purchased from Aldrich Chemical. The Mn of the polyethylenimine was 1200, and the polymer was 60 weight % polyethylenimine and 40 weight % siloxane.

Polyethylenimine

This polymer, Mn=1200, was purchased as a 50 weight % solution in water from Aldrich Chemical.

| | Ink Formulations - Percent Weight | | | |
|---|---|---|---|---|
| Ingredients | Ink A | Ink B | Ink C | Ink D |
| Dispersion 1 (as % pigment) | 4.5 | 4.5 | | |
| Acid Black 194 | | | 3.5 | 3.5 |
| Acrylic Latex | | 3 | | 6 |
| Glycerol | 9 | 9 | 9 | 9 |
| Ethylene Glycol | 6 | 6 | 6 | 6 |
| 1,2-Hexanediol | 5 | 5 | 5 | 5 |
| BYK ® 348 | 0.10 | 0.10 | 0.10 | 0.10 |
| Water | balance | balance | balance | balance |

| | Fixer Formulations - weight percent | | | | |
|---|---|---|---|---|---|
| Ingredients | F1 | F2 | F3 | F4 | F5 | F6 (*) |
| Cationic Siloxane 1 | 8.5 | 10 | | | | |
| Cationic Siloxane 2 | | | 5 | | | |
| Cationic Siloxane 3 | | | | 5 | 5 | |
| Polyethylenimine | | | | | | 5 |
| Methanol | 4.3 | 4.3 | 3 | 5 | 5 | |
| 2-Propanol | | | | | | |
| DGMEA | | 87.5 | | | 45 | |
| 2-Pyrolidinone | | | | | 45 | |
| 85% Phosphoric Acid | | | 0.53 | | | |
| Methane Sulfonic Acid | | | | | | 5 |
| Glycerol | 9 | | 9 | 9 | | 9 |
| Ethylene Glycol | 6 | | 6 | 6 | | 6 |
| 1,2-Hexanediol | 5 | | 5 | 5 | | 5 |

-continued

| Ingredients | Fixer Formulations - weight percent | | | | | |
|---|---|---|---|---|---|---|
| | F1 | F2 | F3 | F4 | F5 | F6 (*) |
| PGMEA | | | | | | |
| BYK ® 348 | 0.1 | | 0.1 | 0.1 | | 0.1 |
| Water | to 100% | — | to 100% | to 100% | — | to 100% |
| PH | 9.6 | — | 4.6 | 9.4 | — | 9.4 |
| Viscosity cP @ 25° C. | 5.1 | 4.9 | 3.0 | 3.4 | 7.4 | 2.7 |

(*)control

DGMEA = Dipropylene Glycol Methyl Ether Acetate
PGMEA = Propylene Glycol Methyl Ether Acetate Print Test The black pen of two Epson 3000 printers operating in the 1440 dpi mode was used to print test patterns ½ inch wide and 6 inches long onto Gilbert bond paper. The first ink was loaded into a cleaned pen of one printer and the second ink was loaded into a cleaned black pen of the other printer. The test page was printed first with one printer (first pass), then immediately fed into the other printer (second pass) and overprinted with the other ink. The time between each pass was no more than about 15 seconds. Inks used in each trial are summarized in the following table. Trials 1, 12, 17 and 22 were baseline (comparative) using no fixer fluid.

| Trial | First Pass | Second pass |
|---|---|---|
| 1 (C) | Ink A | None |
| 2 | Ink A | F1 |
| 3 | F1 | Ink A |
| 4 | Ink A | F2 |
| 5 | F2 | Ink A |
| 6 | Ink A | F3 |
| 7 | F3 | Ink A |
| 8 | Ink A | F4 |
| 9 | F4 | Ink A |
| 10 | Ink A | F5 |
| 11 | F5 | Ink A |
| 12 (C) | Ink B | None |
| 13 | Ink B | F4 |
| 14 | F4 | Ink B |
| 15 | Ink B | F5 |
| 16 | F5 | Ink B |
| 17 (C) | Ink C | None |
| 18 | Ink C | F1 |
| 19 | F1 | Ink C |
| 20 | Ink C | F2 |
| 21 | F2 | Ink C |
| 22 (C) | Ink D | None |
| 23 | Ink D | F1 |
| 24 | F1 | Ink D |
| 25 | Ink D | F2 |
| 26 | F2 | Ink D |
| 27 | Ink C | F4 |
| 28 | F4 | Ink C |
| 29 | Ink C | F5 |
| 30 | F5 | Ink C |
| 31 | Ink D | F4 |
| 32 | F4 | Ink D |
| 33 | Ink D | F4 |
| 34 | F5 | Ink D |
| Comparative | | |
| 35 (C) | Ink C | F6 |
| 36 (C) | F6 | Ink C |

The test strip from each trial was cut into four equal parts and treated immediately after printing as follows:

(a) Air dried at ambient temperature.
(b) Oven dried at 120° C. for 10 minutes.
(c) Passed under a focused radiant heater at 8 feet per minute, whereupon the Te1mperature of the printed area reached about 250° C.
(d) Passed for a second time under the focused radiant heater at 8 feet per minute.

The type of post treatment for each strip is indicated by an "(a)", "(b)", "(c)", or "(d)" after the trial number.

Each strip was given a double strike with a basic hi-liter (Avery #240XX) and an acid hi-liter (Avery #0774X) at 10 minutes after printing and 24 hours after printing, and visually evaluated for smear according to the following scale:

5) very heavily smeared
4) heavily smeared
3) some smearing
2) slightly smeared
1) very slightly smeared
0) no smear Improved fastness (reduced smear or bleed) is an indication that cross-linking occurred.

| Trial | Acid HiLiter Smear Rating | | Alkalai HiLiter Smear Rating | | Optical Density |
|---|---|---|---|---|---|
| | 10 min | 24 hrs | 10 min | 24 hrs | |
| 1 (a) | 5 | 5 | 5 | 5 | 1.34 |
| 1 (b) | 5 | 5 | 5 | 5 | |
| 1 (c) | 5 | 5 | 5 | 5 | |
| 1 (d) | 5 | 4 | 5 | 4 | |
| 2 (a) | 3 | 0 | 3 | 1 | 1.32 |
| 2 (b) | 1 | 0 | 1 | 1 | |
| 2 (c) | 0 | 0 | 1 | 0 | |
| 2 (d) | 1 | 0 | 1 | 0 | |
| 3 (a) | 3 | 2 | 3 | 3 | 1.34 |
| 3 (b) | 1 | 1 | 2 | 1 | |
| 3 (c) | 1 | 0 | 2 | 1 | |
| 3 (d) | 0 | 0 | 1 | 0 | |
| 4 (a) | 2 | 2 | 3 | 3 | 1.32 |
| 4 (b) | 2 | 0 | 3 | 2 | |
| 4 (c) | 0 | 0 | 1 | 0 | |
| 4 (d) | 1 | 0 | 1 | 0 | |
| 5 (a) | 4 | 3 | 4 | 3 | 1.30 |
| 5 (b) | 3 | 1 | 3 | 2 | |
| 5 (c) | 3 | 1 | 3 | 2 | |
| 5 (d) | 1 | 0 | 2 | 0 | |
| 6 (a) | 5 | 3* | 5 | 3* | 1.30 |
| 6 (b) | 3 | 1* | 3 | 1* | |
| 6 (c) | 2 | 1* | 2 | 1* | |
| 6 (d) | 1 | 0* | 1 | 0* | |
| 7 (a) | 5 | 5* | 5 | 5* | 1.41 |
| 7 (b) | 4 | 4* | 4 | 4* | |
| 7 (c) | 4 | 4* | 4 | 4* | |
| 7 (d) | 4 | 3* | 4 | 3* | |
| 8 (a) | 5 | 1 | 5 | 1 | 1.30 |
| 8 (b) | 3 | 1 | 3 | 1 | |
| 8 (c) | 1 | 0 | 1 | 0 | |
| 8 (d) | 0 | 0 | 0 | 0 | |
| 9 (a) | 5 | 4 | 5 | 4 | 1.43 |
| 9 (b) | 4 | 3 | 4 | 3 | |
| 9 (c) | 3 | 3 | 3 | 3 | |
| 9 (d) | 2 | 2 | 2 | 2 | |
| 10 (a) | 5 | 2 | 5 | 2 | 1.27 |
| 10 (b) | 1 | 0 | 1 | 0 | |
| 10 (c) | 0 | 0 | 0 | 0 | |
| 10 (d) | 0 | 0 | 0 | 0 | |
| 11 (a) | 5 | 5 | 5 | 5 | 1.45 |
| 11 (b) | 4 | 4 | 4 | 4 | |
| 11 (c) | 3 | 3 | 3 | 3 | |
| 11 (d) | 3 | 3 | 3 | 3 | |
| 12 (a) | 3 | 2** | 3 | 2** | 1.30 |
| 12 (b) | 2 | 1** | 2 | 1** | |
| 12 (c) | 2 | 1** | 2 | 1** | |

-continued

| Trial | Acid HiLiter Smear Rating 10 min | Acid HiLiter Smear Rating 24 hrs | Alkalai HiLiter Smear Rating 10 min | Alkalai HiLiter Smear Rating 24 hrs | Optical Density |
|---|---|---|---|---|---|
| 12 (d) | 2 | 1** | 3 | 1** | |
| 13 (a) | 3 | 0** | 3 | 0** | 1.29 |
| 13 (b) | 0 | 0** | 0 | 0** | |
| 13 (c) | 1 | 0** | 1 | 0** | |
| 13 (d) | 1 | 0** | 1 | 0** | |
| 14 (a) | 3 | 0** | 3 | 0** | 1.39 |
| 14 (b) | 0 | 0** | 0 | 0** | |
| 14 (c) | 1 | 0** | 0 | 0** | |
| 14 (d) | 1 | 0** | 0 | 0** | |
| 15 (a) | 3 | 0** | 3 | 0** | 1.32 |
| 15 (b) | 0 | 0** | 0 | 0** | |
| 15 (c) | 0 | 0** | 0 | 0** | |
| 15 (d) | 0 | 0** | 0 | 0** | |
| 16 (a) | 3 | 0** | 3 | 0** | 1.36 |
| 16 (b) | 0 | 0** | 0 | 0** | |
| 16 (c) | 0 | 0** | 0 | 0** | |
| 16 (d) | 0 | 0** | 0 | 0** | |

| Trial | Acid HiLiter Smear Rating 10 min | Acid HiLiter Smear Rating 24 hrs | Alkalai HiLiter Smear Rating 10 min | Alkalai HiLiter Smear Rating 24 hrs | Water fastness Rating 10 min | Water fastness Rating 24 hrs | Optical Density |
|---|---|---|---|---|---|---|---|
| 17 (a) | 4 | 4 | 3 | 3 | 5 | 5 | 1.08 |
| 17 (b) | 4 | 4 | 3 | 2 | 5 | 5 | |
| 17 (c) | 3 | 3 | 3 | 2 | 5 | 5 | |
| 17 (d) | 3 | 3 | 3 | 3 | 5 | 5 | |
| 18 (a) | 0 | 0 | 0 | 0 | 0 | 0 | 1.18 |
| 18 (b) | 0 | 0 | 0 | 0 | 0 | 0 | |
| 18 (c) | 0 | 0 | 0 | 0 | 0 | 0 | |
| 18 (d) | 0 | 0 | 0 | 0 | 0 | 0 | |
| 19 (a) | 2 | 1 | 1 | 0 | 1 | 1 | 1.03 |
| 19 (b) | 1 | 0 | 1 | 0 | 1 | 1 | |
| 19 (c) | 1 | 0 | 1 | 1 | 1 | 1 | |
| 19 (d) | 1 | 1 | 1 | 1 | 1 | 1 | |
| 20 (a) | 2 | 1 | 2 | 1 | 5 | 3 | 1.19 |
| 20 (b) | 1 | 1 | 1 | 1 | 3 | 2 | |
| 20 (c) | 1 | 0 | 1 | 0 | 2 | 2 | |
| 20 (d) | 0 | 0 | 1 | 0 | 2 | 2 | |
| 21 (a) | 2 | 1 | 2 | 1 | 3 | 2 | 1.17 |
| 21 (b) | 1 | 1 | 1 | 1 | 2 | 2 | |
| 21 (c) | 2 | 1 | 2 | 1 | 2 | 2 | |
| 21 (d) | 1 | 1 | 1 | 1 | 2 | 2 | |
| 22 (a) | 4 | 4 | 4 | 3 | 5 | 5 | 1.07 |
| 22 (b) | 4 | 4 | 3 | 2 | 5 | 5 | |
| 22 (c) | 3 | 3 | 3 | 2 | 5 | 5 | |
| 22 (d) | 3 | 3 | 3 | 2 | 5 | 5 | |
| 23 (a) | 1 | 0 | 1 | 0 | 1 | 1 | 1.18 |
| 23 (b) | 0 | 0 | 0 | 0 | 0 | 0 | |
| 20 (c) | 0 | 0 | 0 | 0 | 0 | 0 | |
| 23 (d) | 0 | 0 | 0 | 0 | 0 | 0 | |
| 24 (a) | 4 | 4 | 4 | 4 | 4 | 4 | 1.0 |
| 24 (b) | 3 | 1 | 3 | 1 | 4 | 4 | |
| 24 (c) | 3 | 3 | 3 | 3 | 4 | 4 | |
| 24 (d) | 3 | 3 | 3 | 3 | 4 | 4 | |
| 25 (a) | 2 | 1 | 2 | 0 | 1 | 1 | 1.15 |
| 25 (b) | 0 | 0 | 0 | 0 | 1 | 1 | |
| 25 (c) | 0 | 0 | 0 | 0 | 1 | 1 | |
| 25 (d) | 0 | 0 | 0 | 0 | 1 | 1 | |
| 26 (a) | 3 | 1 | 3 | 0 | 2 | 2 | 1.15 |
| 26 (b) | 1 | 1 | 2 | 1 | 2 | 2 | |
| 26 (c) | 1 | 1 | 1 | 0 | 2 | 2 | |
| 26 (d) | 1 | 1 | 1 | 0 | 1 | 1 | |
| 27 (a) | 1 | 0 | 1 | 0 | 0 | 0 | 1.08 |
| 27 (b) | 0 | 0 | 0 | 0 | 0 | 0 | |
| 27 (c) | 0 | 0 | 0 | 0 | 0 | 0 | |
| 27 (d) | 0 | 0 | 0 | 0 | 0 | 0 | |
| 28 (a) | 3 | 2 | 3 | 2 | 0 | 0 | 1.06 |
| 28 (b) | 1 | 1 | 2 | 1 | 0 | 0 | |
| 28 (c) | 1 | 1 | 2 | 1 | 0 | 0 | |
| 28 (d) | 2 | 1 | 2 | 1 | 0 | 0 | |
| 29 (a) | 1 | 0 | 2 | 0 | 0 | 0 | 1.05 |
| 29 (b) | 0 | 0 | 0 | 0 | 0 | 0 | |
| 29 (c) | 0 | 0 | 0 | 0 | 0 | 0 | |
| 29 (d) | 0 | 0 | 0 | 0 | 0 | 0 | |

-continued

|  | Acid HiLiter Smear Rating | | Alkalai HiLiter Smear Rating | | Water fastness Rating | | Optical Density |
|---|---|---|---|---|---|---|---|
|  | 10 min | 24 hrs | 10 min | 24 hrs | 10 min | 24 hrs |  |
| 30 (a) | 2 | 2 | 2 | 2 | 2 | 2 | 1.20 |
| 30 (b) | 1 | 1 | 1 | 1 | 2 | 2 |  |
| 30 (c) | 2 | 2 | 2 | 2 | 2 | 2 |  |
| 30 (d) | 1 | 1 | 1 | 1 | 1 | 1 |  |
| 31 (a) | 1 | 0 | 1 | 0 | 0 | 0 | 1.11 |
| 31 (b) | 0 | 0 | 0 | 0 | 0 | 0 |  |
| 31 (c) | 0 | 0 | 0 | 0 | 0 | 0 |  |
| 31 (d) | 0 | 0 | 0 | 0 | 0 | 0 |  |
| 32 (a) | 4 | 3 | 4 | 4 | 3 | 3 | 1.06 |
| 32 (b) | 2 | 2 | 2 | 1 | 2 | 2 |  |
| 32 (c) | 2 | 1 | 2 | 1 | 1 | 1 |  |
| 32 (d) | 3 | 1 | 2 | 1 | 1 | 1 |  |
| 33 (a) | 1 | 0 | 1 | 0 | 0 | 0 | 1.07 |
| 33 (b) | 0 | 0 | 0 | 0 | 0 | 0 |  |
| 33 (c) | 0 | 0 | 0 | 0 | 0 | 0 |  |
| 33 (d) | 0 | 0 | 0 | 0 | 0 | 0 |  |
| 34 (a) | 2 | 0 | 2 | 0 | 2 | 2 | 1.30 |
| 34 (b) | 0 | 0 | 0 | 0 | 1 | 1 |  |
| 34 (c) | 0 | 0 | 0 | 0 | 1 | 1 |  |
| 34 (d) | 0 | 0 | 0 | 0 | 1 | 1 |  |
| Comparative Trials |  |  |  |  |  |  |  |
| 35 (a) | 2 | 1 | 2 | 2 | 0 | 0 | 1.08 |
| 35 (b) | 1 | 0 | 1 | 1 | 0 | 0 |  |
| 35 (c) | 1 | 1 | 1 | 1 | 0 | 0 |  |
| 35 (d) | 1 | 1 | 1 | 1 | 0 | 0 |  |
| 36 (a) | 4 | 3 | 4 | 3 | 0 | 0 | 1.13 |
| 36 (b) | 3 | 2 | 3 | 3 | 0 | 0 |  |
| 36 (c) | 3 | 2 | 3 | 3 | 0 | 0 |  |
| 36 (d) | 3 | 1 | 3 | 2 | 0 | 0 |  |

In the above tables, a single asterisk (*) after a number indicates the reading was taken at 96 hr instead of 24 hr, and a double asterisk (**) indicates a reading at 72 hr instead of 24 hr.

Ink A contained SDP pigment, and Trial 1 (control) demonstrates the properties of the ink without application of fixer. Trials 2-6 and 8-11 demonstrate that inventive fixers F1, F2, F4 and F5 significantly decreased smear in both the underprinting and overprinting modes although, in some cases, heat was required to realize the full effect. Also, in many cases, underprinting provided an additional benefit of increased OD. In Trial 7, Ink A was underprinted with Fixer F3 and only a marginal improvement in durability occurred compared to Ink A printed by itself.

Ink B contained SDP pigment with a latex polymer additive, and Trial 12 (control) demonstrates the properties of the ink without application of fixer. Trials 13 to 16 demonstrate that inventive fixers F4 and F5 reduced (eliminated) smear in both the underprinting and overprinting modes. Also, with underprinting (Trials 14 and 16), there was the additional benefit of increased OD.

Ink C contained a soluble dye and Trial 17 (control) demonstrates the properties of the ink without application of fixer. The over-all smear fastness was only fair and the water fastness was poor. Overprinting or underprinting with aqueous fixer F1 improved both smear fastness and water fastness, as demonstrated in Trials 18 and 19. The underprinting in Trial 19 resulted in some loss of OD, which often happens with dye-based ink when underprinted with a fixer. Overprinting or underprinting with solvent based fixer F2 also improved both smear fastness and water fastness, as demonstrated in Trials 20 and 21. However, there was no loss of printed black OD in the underprinting, Trial 21. Similar results are seen in Trials 27-30.

Ink D contained soluble dye with latex polymer additive, and Trial 22 (control) demonstrates the properties of the ink without application of fixer. This ink showed no better HiLiter smear fastness or water fastness than Ink C without the latex. Overprinting Ink D with fixer F1 as in Trial 23 and with solvent based fixer F2 resulted in a significant increase in smear fastness and water fastness. Underprinting Ink D with fixer F1 resulted in a marginal improvement of fastness over Ink D by itself at best and with a loss in printed OD. However, underprinting with solvent based F2 significantly increased fastness and increased printed OD. Similar results are seen in Trials 31-34.

Comparative fixer F6 was prepared with a polyethylenimine polymer similar to that in fixer F4 but without crosslinking groups. In Trials 35 and 36, Ink C was overprinted and underprinted with this comparative fixer. While there were improvements in smear fastness compared to Ink C without any fixer, the results were not as good as those obtained with inventive fixer F4 (Trials 27 and 28).

The invention claimed is:

1. A fixer fluid comprising a cationic fixing agent, an oxysilyl groups-containing species and a vehicle, wherein the fixer fluid is substantially colorless, has a surface tension in the range of about 20 dyne/cm to about 70 dyne/cm at 25° C., and a viscosity as high as 30 cP at 25° C., and wherein the oxysilyl groups-containing species is a molecule containing at least two reactive hydroxysilyl, alkoxysilyl, aryloxysilyl and/or acyloxysilyl moieties of the formula selected from the group consisting of formulas (IA) and (IB):

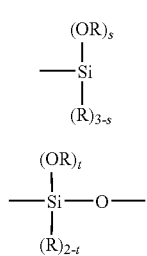

wherein
 each R is Individually a hydrogen, an alkyl group, an aryl group or an acyl group;
 s is 1, 2 or 3; and
 t is 1or 2,
provided that if s or t is 1, then the molecule contains at least two such moieties.

2. The fixer fluid of claim 1, wherein the fixer fluid comprises a cationic fixing agent and an oxysilyl groups-containing species as separate entities.

3. The fixer fluid of claim 2, wherein the cationic fixing agent is selected from the group consisting of a multivalent metal cation, a cationic polymer and mixtures thereof.

4. The fixer fluid of claim 1, wherein the fixer fluid comprises a cationic fixing agent and an oxysilyl groups-containing species in the same molecule.

5. The fixer fluid of claim 4, containing a cationic oxysilyl groups containing species which is a molecule containing at least one covalently bonded cationic moiety, at least one covalently bonded oxysilyl moiety and at least two reactive hydroxysilyl, alkoxysilyl, aryloxysilyl and/or acyloxysilyl moieties.

6. The fixer fluid of claim 5, wherein the cationic moiety is a cationic nitrogen.

7. The fixer fluid of claim 1, wherein the vehicle is an aqueous vehicle.

8. The fixer fluid of claim 1, wherein the vehicle is a non-aqueous vehicle.

9. The fixer fluid of claim 1, wherein each R is individually an alkyl group having from 1 to 4 carbon atoms.

10. An inkjet ink set comprising a fixer fluid and one or more colored inks, wherein each of the one or more colored inks individually comprises a colorant stably dispersed or dissolved in a vehicle, and wherein the fixer fluid comprises a cationic fixing agent, an oxysilyl groups-containing species and a vehicle, wherein the fixer fluid is substantially colorless, has a surface tension in the range of about 20 dyne/cm to about 70 dyne/cm at 25° C. and a viscosity as high as 30 cP at 25° C., and wherein the oxysilyl groups-containing species is a molecule containing at least two reactive hydroxysilyl, alkoxysilyl, aryloxysilyl and/or acyloxysilyl moieties of the formula selected from the group consisting of formulas (IA) and (IB):

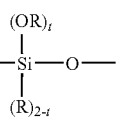

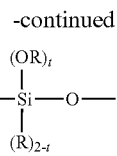

wherein
 each R is individually a hydrogen, an alkyl group, an aryl group or an acyl group;
 s is 1, 2 or 3; and
 t is 1 or 2,
provided that if s or t is 1, then the molecule contains at least two such moieties.

11. The inkjet ink set of claim 10, wherein the one or more colored inks comprises a cyan ink, a magenta ink and a yellow ink.

12. The inkjet ink set of claim 11, wherein the one or more colored inks further comprises a black ink.

13. The inkjet ink set of claim 10, wherein the colorant is an anionic colorant.

14. The inkjet set of claim 10, wherein the vehicle for the fixer fluid is a non-aqueous vehicle, and the vehicle for each of the one or more colored inks is an aqueous vehicle.

15. The inkjet ink set of claim 10, wherein the fixer fluid comprises a cationic fixing agent and en oxysilyl groups-containing species as separate entities.

16. The inkjet ink set of claim 10, wherein the fixer fluid comprises a cationic fixing agent and an oxysilyl groups-containing species in the same molecule.

17. An inkjet printer equipped with an inkjet ink set comprising a fixer fluid and one or more colored inks, wherein each of the one or more colored inks individually comprises a colorant stably dispersed or dissolved in a vehicle, and wherein the fixer fluid comprises a cationic fixing agent, an oxysilyl groups-containing species and a vehicle, wherein the fixer fluid is substantially colorless, has a surface tension in the range of about 20 dyne/cm to about 70 dyne/cm at 25° C. and a viscosity as high as 30 cP at 25° C., and wherein the oxysilyl groups-containing species is a molecule containing at least two reactive hydroxysilyl, alkoxysilyl, aryloxysilyl and/or acyloxysilyl moieties of the formula selected from the group consisting of formulas (IA) and (IB):

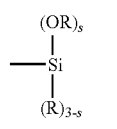

wherein
 each R is individually a hydrogen, an alkyl group, an aryl group or an acyl group;
 s is 1, 2 or 3; and
 t is 1 or 2,
provided that it s or t is 1, then the molecule contains at feast two such moieties.

18. A method for ink jet printing onto a substrate, comprising the steps of:

(a) providing an ink jet printer that is responsive to digital data signals;
(b) loading the printer with a substrate to be printed;
(c) loading the printer with an inkjet ink set; and
(d) printing onto the substrate using the inkjet ink set in response to the digital data signals, wherein the inkjet ink set comprises a fixer fluid and one or more colored inks, wherein each of the one or more colored inks individually comprises a colorant stably dispersed or dissolved in a vehicle, end wherein the fixer fluid comprises a cationic fixing agent, an oxysilyl groups-containing species and a vehicle, wherein the fixer fluid is substantially colorless, has a surface tension in the range of about 20 dyne/cm to about 70 dyne/cm at 26° C. and a viscosity as high as 30 cP at 25° C., and wherein the oxysilyl groups-containing species is a molecule containing at least two reactive hydroxysilyl, alkoxysilyl, aryloxysilyl and/or acyloxysilyl moieties' of the formula selected from the group consisting of formulas (IA) and (IB):

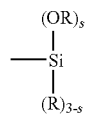
(IA)

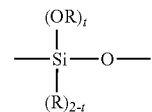
(IB)

wherein each R is individually a hydrogen, an alkyl group, an aryl group or an acyl group;

$s$ is 1, 2 or 3; and $t$ is 1 or 2, provided that if $s$ or $t$ is 1, then the molecule contains at least two such moieties.

* * * * *